Aug. 21, 1951 — E. W. BEDNARZ — 2,565,061
METHOD OF FORMING A TUBULAR GLASS AMPOULE HAVING A CENTRAL TRANSVERSE PARTITION
Filed Dec. 14, 1946 — 2 Sheets-Sheet 1
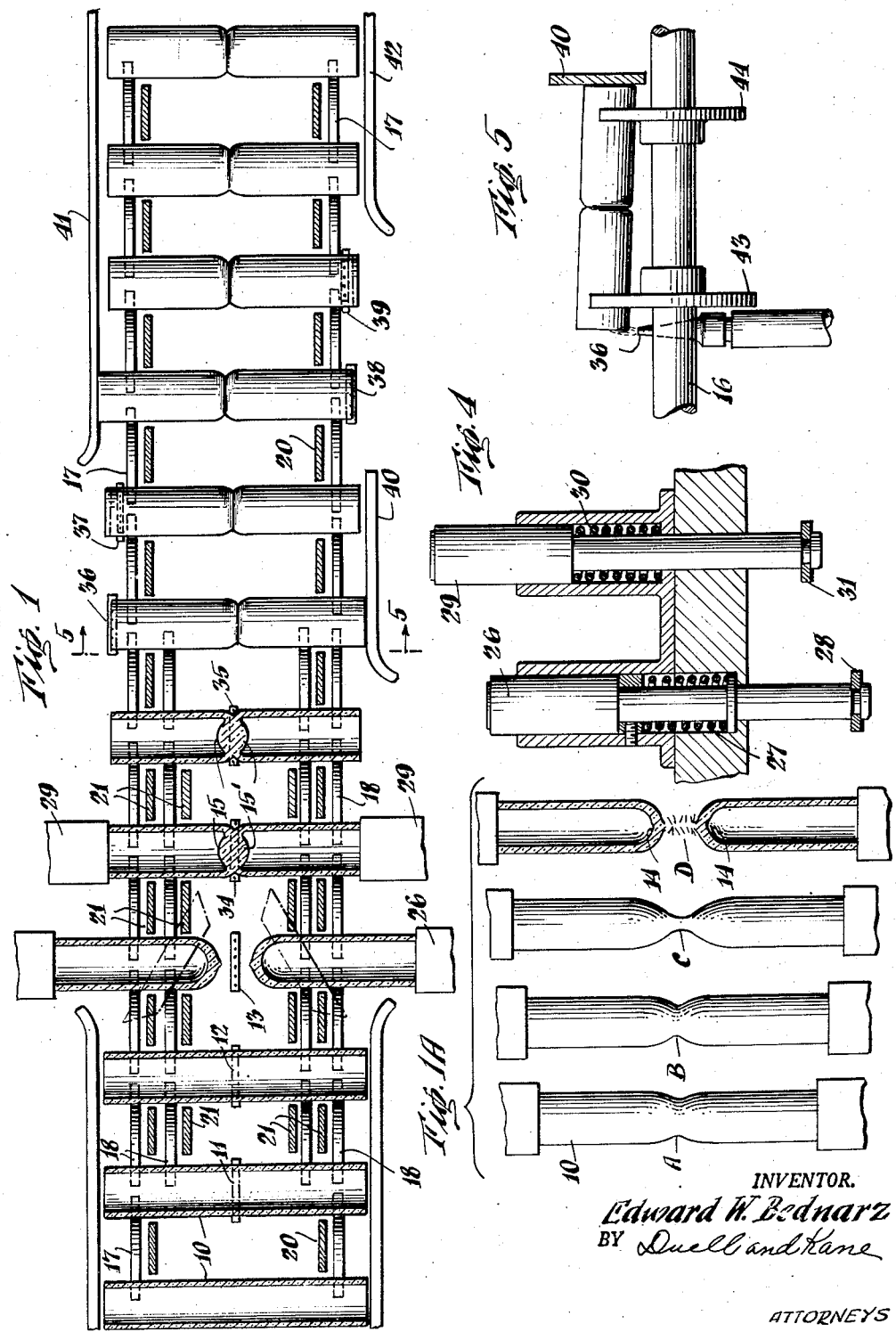
INVENTOR.
Edward W. Bednarz
BY Duell and Kane
ATTORNEYS Aug. 21, 1951     E. W. BEDNARZ     2,565,061
METHOD OF FORMING A TUBULAR GLASS AMPOULE HAVING
A CENTRAL TRANSVERSE PARTITION
Filed Dec. 14, 1946     2 Sheets-Sheet 2
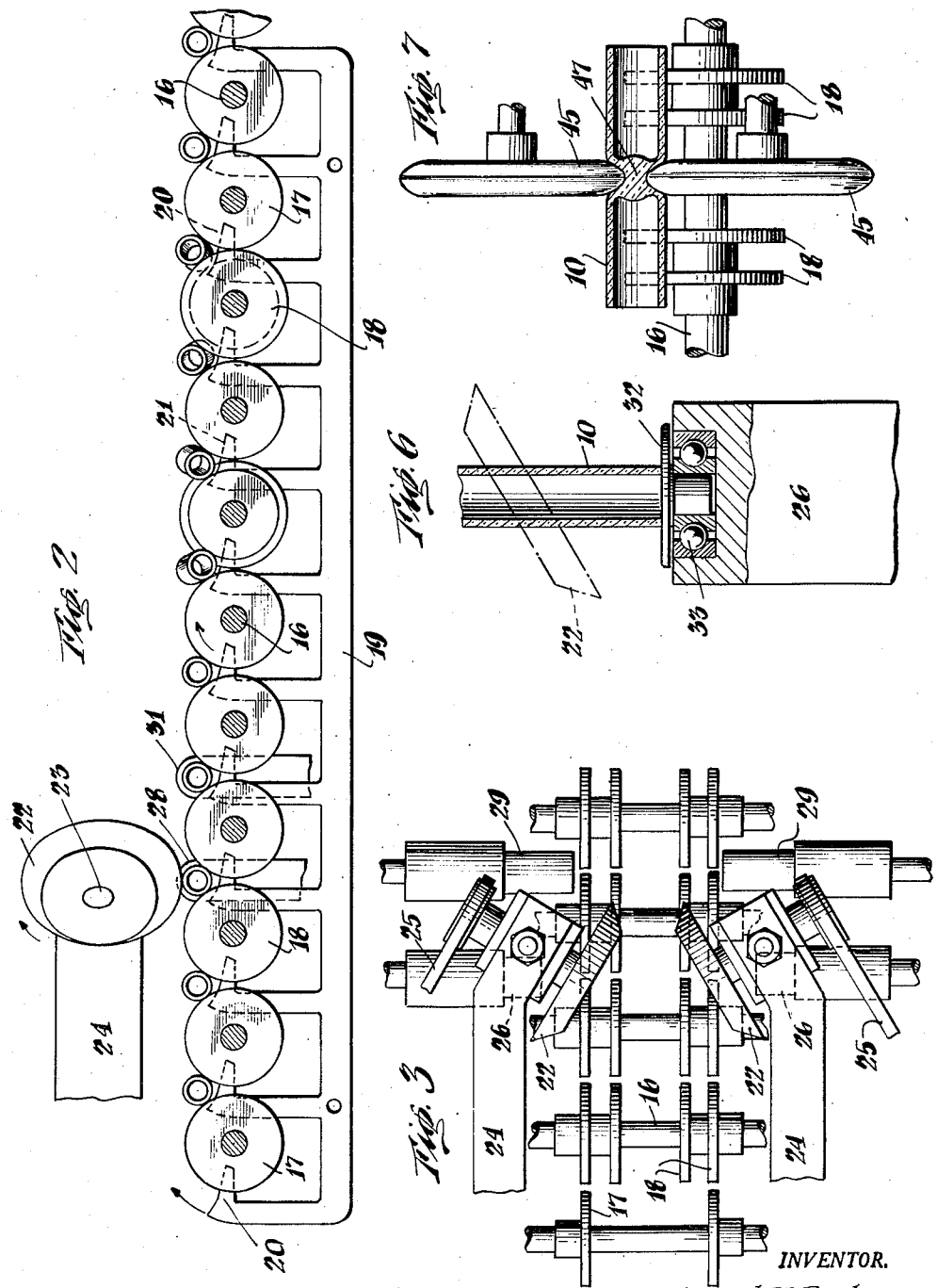
INVENTOR.
BY *Edward W. Bednarz*
*Duell and Kane*
ATTORNEYS Patented Aug. 21, 1951

2,565,061

UNITED STATES PATENT OFFICE 2,565,061

METHOD OF FORMING A TUBULAR GLASS AMPOULE HAVING A CENTRAL TRANSVERSE PARTITION

Edward W. Bednarz, Clifton, N. J., assignor to Becton, Dickinson & Co., Rutherford, N. J., a corporation of New Jersey Application December 14, 1946, Serial No. 716,228

4 Claims. (Cl. 49—84)

This invention relates to a method for the formation of ampules or cartridges and by means of which an improved unit will be economically produced.

A further object is that of teaching a method of manufacture of ampules of this type and which method will lend itself to quantity production procedure supervised by relatively unskilled labor.

With these and other objects in mind, reference is had to the attached sheets of drawings illustrating practical embodiments of the invention and, in which:

Fig. 1 is a somewhat schematic view of the operating bed of the machine and in particular that portion of the same in which the cartridges or ampules are subjected to the forming stages;

Fig. 1(A) is a similar schematic view illustrating the detailed steps of operation which occur at one of the stations generally illustrated in Fig. 1;

Fig. 2 is a diagrammatic side view of the machine as shown in Fig. 1;

Fig. 3 is a plan view of such machine, such plan view showing the construction of the parts adjacent one machine station;

Fig. 4 shows the plungers or slides which preferably form a part of the machine;

Fig. 5 is a transverse sectional view taken along lines 5—5 and in the direction of the arrows as indicated in Fig. 1;

Fig. 6 shows a fragment of one of these slides with certain of the parts illustrated in section; and Fig. 7 is a somewhat diagrammatic view of an alternative form of construction which may be adopted at a certain station of the machine.

By the present machine and method there is provided a double-ended ampule of extremely rigid construction and which under ordinary usage will be free from breakage. This ampule may receive medicament and may subsequently be employed in connection with a hypodermic syringe in order that the medicament may be dispensed through a needle and injected. In such operation an ampule constructed according to the present teachings will have both of its compartments in substantially perfect alignment so that no difficulties will be experienced in its cooperation with the syringe or holder.

As will appear in the following specification, the entire ampule body including both of its compartments will be formed from a single tube portion. This portion will be manipulated to provide the finished unit or ampule. That unit will be characterized by compartments having outer open ends, the inner ends being separated by an integral partition embodying a relatively strong structure. Accordingly, no difficulties will be experienced incident to an embryonic line of fracture or weakening adjacent such partition. This is quite aside from the fact that the outer or open ends of the ampule will be smoothed, the axes of the compartments will be in substantially perfect alignment, etc.

I have found that to construct the ampule of glass it is desirable that glass tubes be cut into sections of suitable and uniform lengths. The central portions of these tubes are subjected to heat of gradually increasing intensity. Simultaneously, the tubes are manipulated so that heating will occur uniformly around the circumference of their bodies. This heating is confined to substantially the central portion of each tube section. When such portion has been heated to a sufficient degree, the opposite tube ends are drawn away from each other until either separate, or substantially separate tube sections exist. Thereupon, these sections are reconnected. In such connection, registry of alignment is maintained. Additionally, however, the partition which results, is so formed that it is preferably thickened throughout its central area. By such construction an extremely desirable, as well as rigid design is achieved.

Either prior to the formation of this central wall or partition or else—subsequent thereto— the ends of the tube or ampule are smoothed or glazed so that no improper edge portions are presented. In accordance with the present invention it is definitely preferred that this glazing operation be achieved subsequently to the formation of the central partition.

Thus, referring primarily to Fig. 1 and for the moment disregarding the incidental mechanism which has been shown in this view, it will be observed that the numeral 10 indicates a glass tube of suitable length. This tube is subjected to a pre-heating operation by a burner indicated at 11. The heat value of the flame to which the tube is subjected at this station may be of the order of 500 degrees F. Thereafter, the tube passes to a point where it is subjected to the heat of a flame emanating from a burner 12. By this flame the central area of the tube is heated, again for example, to approximately 1000 degrees F. Thereafter, the central zone of the tube is caused to pass over a burner 13. The intensity of flame emanating from this burner may be such that a temperature of approximately 1350 degrees F. is achieved. The foregoing assumes that the tube 10 is made of glass composition which will have a melting point of approximately 1210 to 1290 degrees F. Therefore it will be understood that with a temperature of approximately 1350 degrees F. the central area of the tube will be substantially in a molten condition as it lies over the burner 13.

Now referring to Fig. 1(A) in conjunction with Fig. 1, it is to be understood that the ends of the tube are subjected to a pulling action such, that in this form of construction, they are caused to separate. This will have the initial effect that the central tube area will be reduced as indicated at A. Continued pulling will result in a further reduction as indicated at B, where in effect a definite neck portion is being established. Still further continuing this action, and as the overall length of the tube increases, this neck portion will be reduced to a member indicated at C which in effect is a filament. Thereupon, while still subjected to approximately 1350 degrees F., a further separation of the end portions results in this filament's being dispersed as indicated at D. Under such conditions the central areas of the tube automatically assume a configuration presenting end walls 14 which are centrally somewhat thickened as shown in the last portion of Fig. 1(A). If now the two tube sections are brought into abutting contact, while still incandescent or substantially fluid, it will be found that with registry maintained, they will not alone be in proper alignment but the central partition will be domed or convex throughout its central area as indicated at 15 and 15'. For purposes of illustration this doming has been somewhat exaggerated in the view in question. Thereafter the ends of the resultant ampule may be glazed or smoothed.

To achieve the foregoing, a number of different machines may be employed. However, it is preferred, in accordance with the present teachings, to utilize a machine of the type illustrated in Figs. 1 to 3 and the parts of which are modified as described. Thus, as illustrated especially in Fig. 2, a frame of a machine (not shown) rotatably supports a number of shafts 16. These shafts may rotate in substantial synchronism and in a single direction by employing any desired form of drive. At one end of the machine a hopper or receptacle (not shown) is provided to receive the pre-cut tube sections 10. This receptacle or its equivalent serves to deposit the sections sequentially so that the tubes come to lie between the rollers or discs 17 associated with the initial pair of shafts 16. These discs or rollers are continued on successive shafts; only one such roller pair having been shown in the views under consideration. At points beyond these pairs of rollers, double pairs of rollers 18 are mounted on the shafts. This may be continued through, for example, five shafts 16. At points beyond the pairs of double rollers single rollers 17 may be again employed. In any event and as especially shown in Figs. 1 and 2, the spacing between the rollers on different shafts is such that the tube sections will, under the influence of gravity, rest well below the upper plane into which the roller peripheries extend. As is apparent, with the shafts 16 rotating and the tube sections in contact with the rollers, these tubes continuously rotate. It is obvious that any one of a number of desirable constructions to achieve this rotation might be employed.

With a view to advancing the tube sections from one to another pair of rollers, it is preferred that an intermittent feeding mechanism be utilized. As somewhat diagrammatically indicated in Figs. 1 and 2, this mechanism may take the form of a frame 19 mounted to have arcuate movement. This frame will carry a plurality of engaging elements 20 which will normally lie just out of contact with the lower surface of the tube or ampule sections. However, when the frame is projected they will engage with the tubes or ampules so that each element of the latter series will advance from a position between a pair of shafts 16 to a position between the next adjacent shafts of the series. As shown especially in Fig. 2, the engaging elements 20 may lie adjacent the rollers 17. Where two pairs of rollers 18 are associated with a shaft, then two pairs of engaging elements 21 are preferably disposed one between the individual rollers of each pair and the other inwardly of the innermost rollers. This will assure proper support of the tube sections as they are transferred from one to the next station.

At one of these stations, as shown in Figs. 1 to 3, that manipulation primarily involves the complete separation of the tube sections to provide two portions preferably having thickened inner face or base portions. It also involves at a subsequent station reconnection of those sections in proper alignment and so as to provide a single central wall or partition dividing the ampule or cartridge into two compartments. In providing such a partition it is definitely preferred that in accordance with the present teachings a wall of excessive strength be furnished rather than a wall which will be so thin as to present danger of fracture along its zone as the unit is subsequently used by physicians and technicians.

I have found that in certain respects a most desirable form of mechanism for achieving a separation of the tube sections, comprises a pair of rollers or discs which are tangentially disposed at the path of travel of the tubes. These rollers as especially shown in Figs. 2 and 3 may include bodies 22 which are beveled adjacent their peripheries and which are mounted for rotation by shafts 23; such rotation being in the illustrated embodiment in a clockwise direction. The shafts are rotatably supported adjacent the outer ends of arms 24. The inner ends of these arms may be suitably mounted so as to periodically swing. The shafts 23 are driven in any desired manner, such as by belts 25. Other forms of drive may be employed, but it is preferred that the rollers 23 rotate continuously as the arms 24, or their equivalents, are periodically raised and lowered.

Due to the fact that the discs 22 are disposed at a tangent to the path of travel of the tube sections, it is apparent that as in Figs. 1 and 1(A) these discs, upon engaging the ends of the tube sections, will draw the same apart to a point where actual separation of the sections occurs. When the discs are out of contact with the tube sections, heat transfer between these discs and the sections will, of course, be interrupted. This will be true throughout a substantial portion of a cycle. Moreover, engagement between the tube ends and these discs will occur at points relatively remote from the zone of the burner 13. Therefore, while it is preferred that the discs or rollers 28 be formed of a composition material, it is apparent that they will not be damaged incident to the action of heat.

During the aforedescribed separating action, the entire tube will normally be supported adequately by the pairs of double engaging elements 21. Therefore, the alignment of the different tube sections will at no time be substantially disturbed. It should be borne in mind that while in the preferred form of the invention, the tube sections should reach a point of physical separation, it is unnecessary and undesirable that they be permitted to separate to too great an extent. With the foregoing in mind, stops are furnished adjacent the separation station. These stops conveniently include a pair of opposed blocks or slides 26. These are slidably mounted in the frame or guiding portions of the machine and may be normally retracted by springs 27 as shown in Fig. 4. Actuating arms 28 are secured to the outer extensions of the slides 26 and are reciprocated. Therefore, it is apparent that adjacent the station where the nozzle 13 is situated not alone do the peripheries of the discs 22 cooperate with the tube sections adjacent their ends but also the blocks 26 function as stops to control the rapidity and amount of separation which may be thus effected.

The parts at this station should be rather carefully timed so that the following sequence of events will occur:

(A) The ends of the tube move in opposite and outward directions.

(B) They substantially immediately contact the adjacent faces of the slides.

(C) The latter are shifted outwardly by the arms 28 or their equivalents against the action of the springs 27.

(D) The separation of the tube sections is limited by these slides or blocks so that in the embodiment under consideration the instant complete physical separation occurs as in (D) at Fig. 1(A), further outward movement of the tube sections is prevented. Therefore, a substantially complete control is established which involves the melting action of the flame, the separation of the tube sections by the discs 22 or their equivalents and the controlling and limiting of such separation by the slides.

Adjacent the slides 26 but beyond the nozzle 13, slides 29 are disposed. These are normally urged inwardly by springs 30. Their projection is controlled by arms 31 similar to the arms 28. The pairs of arms 28 and 31 are timed so as to alternately and simultaneously project and retract. As the slides 29 are projected inwardly, the separate tube sections are axially shifted towards each other to an extent such that the base portions thereof are caused to merge. With such base portions thickened (as is preferably the case), but in any event, as the curved end walls 14 are flattened, it is obvious that convex surfaces such as 15 and 15' are provided in the central area of the partition wall extending into the base portions of each ampule. Care must be exercised in adjusting the travel of the blocks or slides 29 so that the tube sections are not shifted towards each other to too great an extent. Otherwise an outward bulging and/or general deformation of the ampule or cartridge body might result.

In order to prevent any binding contact between the ends of the tube or cartridge and the slides 26 and 29 an anti-friction support is preferably furnished. As shown especially in Fig. 6, a disc or plate 32 is rotatably mounted to extend beyond the face of the slide. This is preferably true of each of the slides 26 and 29. Such rotatable mounting may be assured by the use of radial or thrust bearings 33. As is apparent, the plate or disc 32 will thus readily rotate. Therefore, as the tube section bears against this disc, no binding contact will occur and the section or cartridge will be completely free to turn.

As indicated by the reference number 34, a nozzle underlies the central area of the thus established ampule. This nozzle may, for example, generate a flame having a temperature of approximately 1100 degrees F. so that both annealing and—if necessary—sizing of the ampule will occur. A nozzle 35 underlying the next station may again, for example, generate a temperature of approximately 500 degrees F. to provide a second annealing stage.

Further nozzles may be employed acting upon the central zone of the cartridge, should such additional nozzles prove to be desirable. In such event, the temperature of the flame generated by the nozzle 35 may be higher than indicated with subsequent nozzles furnishing a flame generating a lesser temperature.

Now, in order to temper and glaze: first the outer end of one section of the ampule and then the outer end of the second of the same, nozzles 36 and 37 are disposed adjacent the first ampule end. While nozzle 36 has its flame directed against the edge of the cartridge, nozzle 37 directs its flame at a point spaced inwardly thereof. Nozzles 36 may generate a flame of, for example, 1300 degrees F. to temper and glaze the outer end of one ampule section. The nozzle 37 may, for example, generate a flame of approximately 500 degrees F. to provide a second tempering action and to further glaze this end of the ampule. At the next station, a nozzle 38 may generate a 1300 degree F. flame at the outer end of the second ampule section. Thereafter, a second and inwardly spaced nozzle 39, corresponding to nozzle 37, may generate a flame on the order of 900 degrees F. to provide a second stage of glazing and tempering. Further nozzles (not shown) may be provided if it is desired to achieve intermediate temperatures or if it is desired to have the outer ends of the ampule subjected to initial low temperatures rather than immediately subjecting them to the high temperature of 1300 degrees F.

In any event, guides 40, 41 and 42 are furnished throughout this zone of the machine. The first two of these guides assure a support such that a smoothing or glazing of the ampule ends occurs. As especially shown in Fig. 5, the rollers throughout this zone of the machine may be so disposed that the axes of the ampules are alternatively tilted in one or the other direction. This may be achieved by employing one relatively large and one relatively small roller 43 and 44 respectively. By such tilting a zone treatment is assured between the ampule ends and the adjacent flames. Consequently, one may be assured that the outer ends of all ampules or cartridges will be properly surfaced in a manner such that no danger will exist, in subsequent operations, of the fingers of an operator being cut incident to contact with the ampule itself.

Finally referring to the structure illustrated in Fig. 7, it is primarily to be understood that this illustrates merely the station adjacent which the burner 13 is disposed in Fig. 1 and in which the sequential operations diagrammatically shown in Fig. 1(A) occur. Therefore, in Fig. 7, it is to be understood that the central portion of the tube 10 has been heated to a point where it is molten or substantially so. At this moment a suitable set of rotating wheels or discs 45 are brought into contact with this central zone and are shifted to a position where they are separated to only a very minor extent. Under these circumstances, the central area of the tube 10 will be constricted or pinched together as has been indicated at 47. This will serve to form an embryonic partition. Thereafter, by shifting the tube ends towards each other, the complete cartridge is formed. Such latter shifting may occur either through the use of slides 29 or otherwise. As will also be understood, should wheels or discs such as 22 prove to be desirable, they may also be employed at this station. However, ordinarily, such discs need not be so employed.

In the case of a mechanism such as this, it is apparent only a substantial separation of the tube section will occur. Such separation will not be complete. Ordinarily, it will suffice to indent or constrict the center of the tube as in Fig. 7. Thereupon, by constricting the length of the tube—while properly supporting the same—a proper double ended cartridge or ampule results.

Thus, among others, the several objects of the invention as specifically aforenoted are achieved. Obviously numerous changes in construction of the ampule might be resorted to without substantially altering the machine and/or method. Also, the parts of the machine might be redesigned and rearranged aside from the fact that the steps of the method might be varied without departing from the spirit of the invention as defined by the claims.

What I claim is:

1. A method of forming a tubular glass ampule having a central transverse partition, said method including the employment of an uninterrupted tube section having a greater length than that which is to be embodied within the finished ampule, heating said section at a zone intermediate its ends to render said zone plastic, drawing the ends of said tube away from each other to reduce the tube diameter through said plastic zone and under continued drawing action dividing said tube into two separate sections at said zone, controlling the drawing action so that at the instant of separation each of said sections will embody a closed thickened inner end wall, joining the thickened plastic end walls of the sections together so that the sections will merge into a single ampule with a central transverse partition extending across its bore and regulating the force of such joining in a manner so that the inner faces of the thickened end walls of the sections will form convex partition faces.

2. A method of forming a tubular glass ampule having a central transverse partition, said method including the employment of an uninterrupted tube section having a greater length than that which is to be embodied in the finished ampule, heating said section at a zone intermediate its ends to render said zone plastic, reducing the bore of said tube within said zone to provide a pair of tube sections having their inner ends closed, joining such inner ends to furnish an ampule with a transversely extending and thickened partition, exerting axial thrust upon the outer ends of the tube to constrict the same to a length equal to that to be embodied in the finished ampule and to simultaneously cause the excess material providing the thickened partition to move to provide convexly rounded inner partition faces.

3. A method of forming a tubular glass ampule having a central transverse partition, said method including the employment of an uninterrupted tube section having a greater length than that which is to be embodied in the finished ampule, heating said section at a zone intermediate its ends to render said zone plastic, reducing the bore of said tube within said zone to provide a pair of tube sections having their inner ends closed, joining such inner ends to furnish an ampule with a transversely extending and thickened partition and in exerting axial thrust upon the outer ends of the tube to constrict the same to a length equal to that to be embodied in the finished ampule, to simultaneously cause the excess material providing the thickened partition to move to provide convexly rounded inner partition faces and in thereafter subjecting said ampule throughout a zone solely in line with said partition to the action of heat to anneal the same.

4. A method of forming a tubular glass ampule having a central transverse partition, said method including the employment of an uninterrupted tube section having a greater length than that which is to be embodied in the finished ampule, heating said section at a zone intermediate its ends to render said zone plastic, reducing the bore of said tube within said zone to provide a pair of tube sections having their inner ends closed, joining such inner ends to furnish an ampule with a transversely extending and thickened partition, exerting axial thrust upon the outer ends of the tube to constrict the same to a length equal to that to be embodied in the finished ampule and to simultaneously cause the excess material providing the thickened partition to move to provide convexly rounded inner partition faces, and continuously rotating the tube sections and the formed ampule during the preceding operations while maintaining all parts of the tube and ampule substantially in axial alignment.

EDWARD W. BEDNARZ.

REFERENCES CITED

The following references are of record in the file of this patent:

UNITED STATES PATENTS

| Number | Name | Date |
|---|---|---|
| 1,055,402 | Kimble | Mar. 11, 1913 |
| 1,322,779 | Frederick et al. | Nov. 25, 1919 |
| 1,817,826 | Kee | Aug. 4, 1931 |
| 2,103,585 | Kimble et al. | Dec. 28, 1937 |
| 2,153,594 | Saffir | Apr. 11, 1939 |
| 2,227,224 | Kimble et al. | Dec. 31, 1940 |
| 2,297,335 | Wheaton | Sept. 29, 1942 |
| 2,300,917 | Gaskill | Nov. 3, 1942 |

FOREIGN PATENTS

| Number | Country | Date |
|---|---|---|
| 117,427 | Australia | Sept. 2, 1943 |